United States Patent
Prakash et al.

(10) Patent No.: US 6,742,072 B1
(45) Date of Patent: May 25, 2004

(54) METHOD AND APPARATUS FOR SUPPORTING CONCURRENT SYSTEM AREA NETWORK INTER-PROCESS COMMUNICATION AND I/O

(75) Inventors: Ramkrishna V. Prakash, Houston, TX (US); Sompong P. Olarig, Cypress, TX (US); William F. Whiteman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 09/652,321

(22) Filed: Aug. 31, 2000

(51) Int. Cl.⁷ .................. G06F 13/41; G06F 15/167; G06F 15/16
(52) U.S. Cl. .............. 710/305; 709/213; 709/248
(58) Field of Search .............. 710/100, 300, 710/106, 305, 311, 312, 313, 314, 315, 316; 709/200–204, 212–213, 216–220, 227–232, 248, 304

(56) References Cited

U.S. PATENT DOCUMENTS

| | | | | |
|---|---|---|---|---|
| 4,979,097 A | * | 12/1990 | Triolo et al. ............ 709/253 |
| 5,668,803 A | * | 9/1997 | Tymes et al. ........... 370/312 |
| 5,838,906 A | * | 11/1998 | Doyle et al. ............ 709/202 |
| 6,006,289 A | * | 12/1999 | James et al. ............ 710/35 |
| 6,041,376 A | * | 3/2000 | Gilbert et al. .......... 710/108 |
| 6,057,863 A | * | 5/2000 | Olarig .................. 345/520 |
| 6,175,856 B1 | * | 1/2001 | Riddle ................. 709/204 |
| 6,243,794 B1 | * | 6/2001 | Casamatta .............. 711/153 |
| 6,266,722 B1 | * | 7/2001 | Ogura .................. 710/100 |
| 6,341,274 B1 | * | 1/2002 | Leon ................... 705/410 |
| 6,449,677 B1 | * | 9/2002 | Olarig et al. .......... 710/305 |
| 6,584,539 B1 | * | 6/2003 | James et al. ........... 710/314 |

OTHER PUBLICATIONS

"Virtual Interface Architecture for Clustered Systems," downloaded from <http://www.del.com/us/en/biz/topics/vectors_1998–wpvia.htm>on Aug. 11, 2000.

"SeverNet Interconnect Technology," *Tandem Computers Incorporated* ©1995.

* cited by examiner

*Primary Examiner*—Tim Vo

(57) ABSTRACT

A new technique for transferring data between nodes of a clustered computing system is disclosed. In one aspect, the invention includes a cluster node comprising a system bus; a memory device; and an internodal interconnect. The internodal interconnect is electrically connected to the system bus and includes a remote connection port. The internodal interconnect is capable of transferring data from the memory device and through the remote connection port. In a second aspect, a the invention includes method for internodal data transfer in a clustered computing system. Each of at least two clusters includes an internodal interconnect electrically connected to a system bus and a memory device to the system bus. The method itself comprises requesting a data transfer and then transferring the requested data. The requested data is transferred from the memory device in a first cluster node to the memory device in a second cluster node via the internodal interconnects in the first and second cluster nodes.

55 Claims, 7 Drawing Sheets

METHOD AND APPARATUS FOR SUPPORTING CONCURRENT SYSTEM AREA NETWORK INTER-PROCESS COMMUNICATION AND I/O

BACKGROUND OF THE INVENTION

1. Field of the Invention

The present invention pertains to data transfers in multi-processor computing systems, and, more particularly, to a method and apparatus for supporting concurrent system area network inter-process communication and input/output ("I/O").

2. Description of the Related Art

Even as the power of computers continues to increase, so does the demand for ever greater computational power. In digital computing's early days, a single computer comprising a single central processing unit ("CPU") executed a single program. Programming languages, even those in wide use today, were designed in this era, and generally specify the behavior of only a single "thread" of computational instructions. Computer engineers eventually realized that many large, complex programs typically could be broken into pieces that could be executed independently of each other under certain circumstances. This meant they could be executed simultaneously, or "in parallel." Thus, a computing technique known as parallel computing arose. Parallel computing typically involves breaking a program into several independent pieces, or "threads," that are executed independently on separate CPUs. Parallel computing is sometimes therefore referred to as "multiprocessing" since multiple processors are used. By allowing many different processors to execute different processes or threads of a given application program simultaneously, the execution speed of that application program may be greatly increased.

In the most general sense, multiprocessing is defined as the use of multiple processors to perform computing tasks. The term could apply to a set of networked computers in different locations, or to a single system containing several processors. However, the term is most often used to describe an architecture where two or more linked processors are contained in a single enclosure. Further, multiprocessing does not occur just because multiple processors are present. For example, having a stack of PCs in a rack serving different tasks, is not multiprocessing. Similarly, a server with one or more "standby" processors is not multiprocessing, either. The term "multiprocessing", therefore, applies only when two or more processors are working in a cooperative fashion on a task or set of tasks.

In theory, the performance of a multiprocessing system could be improved by simply increasing the number of processors in the multi-processing system. In reality, the continued addition of processors past a certain saturation point serves merely to increase communication bottlenecks and thereby limit the overall performance of the system. Thus, although conceptually simple, the implementation of a parallel computing system is in fact very complicated, involving tradeoffs among single-processor performance, processor-to-processor communication performance, ease of application programming, and managing costs. Conventionally, a multiprocessing system is a computer system that has more than one processor, and that is typically designed for high-end workstations or file server usage. Such a system may include a high-performance bus, huge quantities of error-correcting memory, redundant array of inexpensive disk ("RAID") drive systems, advanced system architectures that reduce bottlenecks, and redundant features such as multiple power supplies.

There are many variations on the basic theme of multiprocessing. In general, the differences are related to how independently the various processors operate and how the workload among these processors is distributed. Two common multiprocessing techniques are symmetric multiprocessing systems ("SMP") and distributed memory systems. One characteristic distinguishing the two lies in the use of memory. In an SMP system, at least some portion of the high-speed electronic memory may be accessed, i.e., shared, by all the CPUs in the system. In a distributed memory system, none of the electronic memory is shared among the processors. In other words, each processor has direct access only to its own associated fast electronic memory, and must make requests to access memory associated with any other processor using some kind of electronic interconnection scheme involving the use of a software protocol. There are also some "hybrid" multiprocessing systems that try to take advantage of both SMP and distributed memory systems.

SMPs can be much faster, but at higher cost, and cannot practically be built to contain more than a modest number of CPUs, e.g., a few tens. Distributed memory systems can be cheaper, and scaled arbitrarily, but the program performance can be severely limited by the performance of the interconnect employed, since it (for example, Ethernet) can be several orders of magnitude slower than access to local memory.) Hybrid systems are the fastest overall multiprocessor systems available on the market currently. Consequently, the problem of how to expose the maximum available performance to the applications programmer is an interesting and challenging exercise. This problem is exacerbated by the fact that most parallel programming applications are developed for either pure SMP systems, exploiting, for example, the "OpenMP" ("OMP") programming model, or for pure distributed memory systems, for example, the Message Passing Interface ("MPI") programming model.

However, even hybrid multiprocessing systems have drawbacks and one significant drawback lies in bottlenecks encountered in retrieving data. In a hybrid system, multiple CPUs are usually grouped, or "clustered," into nodes. These nodes are referred to as SMP nodes. Each SMP node includes some private memory for the CPUs in that node. The shared memory is distributed across the SMP nodes, with each SMP node including at least some of the shared memory. The shared memory within a particular node is "local" to the CPUs within that node and "remote" to the CPUs in the other nodes. Because of the hardware involved and the way it operates, data transfer between a CPU and the local memory can be 10 to 100 times faster than the data transfer rates between the CPU and the remote memory.

Thus, a clustered environment consists of a variety of components like servers, disks, tapes drives etc., integrated into a system wide architecture via System Area Network ("SAN") Fabric. A SAN architecture employs a switched interconnection (e.g., ServerNet or InfiniBand) between multiple SMPs. A typical application of a SAN is the clustering of servers for high performance distributed computing. Exemplary switched interconnections include, but are not limited to, ServerNet and InfiniBand, a technical specification promulgated by the InfiniBand Trade Organization.

Currently, two types of data transfer are currently being used for moving data across various components of a cluster. The first called IPC, is mainly involved in providing inter-process communication by performing memory-to-memory transfers. More particularly, IPC is a capability supported by some operating systems that allows one process to communicate with another process. A process is, in this context, an executing program or task. In some instances, a process might be an individual thread. IPC also allows several applications to share the same data without interfering with one another. The second type of data transfer is involved with at least one I/O device e.g., inter-node memory-to-disk and disk-to-disk transfer of data.

FIG. 1 illustrates one physical architecture of a computing system 100 currently available to realize the three logical interconnections between two Nodes that may arise from device data transfers. Each node 110 is shown including only a single CPU 125, but may include several CPUs 125. The computing system 100 is a "hybrid" system exhibiting characteristics of both SMP and distributed memory systems. Each node 110 includes shared memory 115, provided by the shared disk(s) 120, accessible by all the CPUs 125 in the computing system 100 and private memory 130, provided by the private disks 135, for each individual CPU 125.

The three types of logical interconnections for internodal data transfer are:

memory to memory, e.g., from the host memory 140 in one node 110 to the host memory 140 in the other node 110;

memory to disk, e.g., from the host memory 140 in one node 110 to a shared disk 120 or a private disk 135 in the other node 110; and disk to disk, e.g. from a shared disk 120 or a private disk 135 in one node 110 to a shared disk 120 or a private disk 135 in the other node 110.

As can be seen from FIG. 1, all three logical connections will occur over the peripheral component interconnect ("PCI") buses 145. Under the protocols defining the operation of the PCI bus 145, each internodal data transfer will need to arbitrate with other computing resources for control of the PCI bus 145. Furthermore, if the CPU 125 were to need access to other devices, e.g., the device 150, sitting on the PCI bus 145, it too would be required to arbitrate.

This quickly results in the PCI Bus 145 becoming a bottleneck for performance. The old approach represented in FIG. 1 suffers from the following drawbacks:

only memory-to-memory or disk-to-disk memory transfers are possible at any given time;

memory-to-memory transfer access speeds are limited to PCI speeds (assuming serial interconnect speeds ramp up);

access of memory would prevent access of other devices on the PCI bus by other devices;

peer-to-peer access would result in non-accessibility of other devices on both PCI buses (e.g., the PCI buses 145, 155); and allows only one inter-node transaction to occur at any given time. Hence, there is a need for a technique that will permit concurrent access for memory-to-memory transfers between nodes, memory to device transfers within a node and for memory-to-disk or disk-to-disk transfers between nodes.

The present invention is directed to resolving, or at least reducing, one or all of the problems mentioned above.

SUMMARY OF THE INVENTION

A new technique for transferring data between nodes of a clustered computing system is disclosed. In one aspect, the invention includes a cluster node comprising a system bus; a memory device; and an internodal interconnect. The internodal interconnect is electrically connected to the system bus and includes a remote connection port. The internodal interconnect is capable of transferring data from the memory device and through the remote connection port. In a second aspect, a the invention includes method for internodal data transfer in a clustered computing system. Each of at least two clusters includes an internodal interconnect electrically connected to a system bus and a memory device to the system bus. The method itself comprises requesting a data transfer and then transferring the requested data. The requested data is transferred from the memory device in a first cluster node to the memory device in a second cluster node via the internodal interconnects in the first and second cluster nodes.

BRIEF DESCRIPTION OF THE DRAWINGS

The invention may be understood by reference to the following description taken in conjunction with the accompanying drawings, in which like reference numerals identify like elements, and in which.

Figure 1:
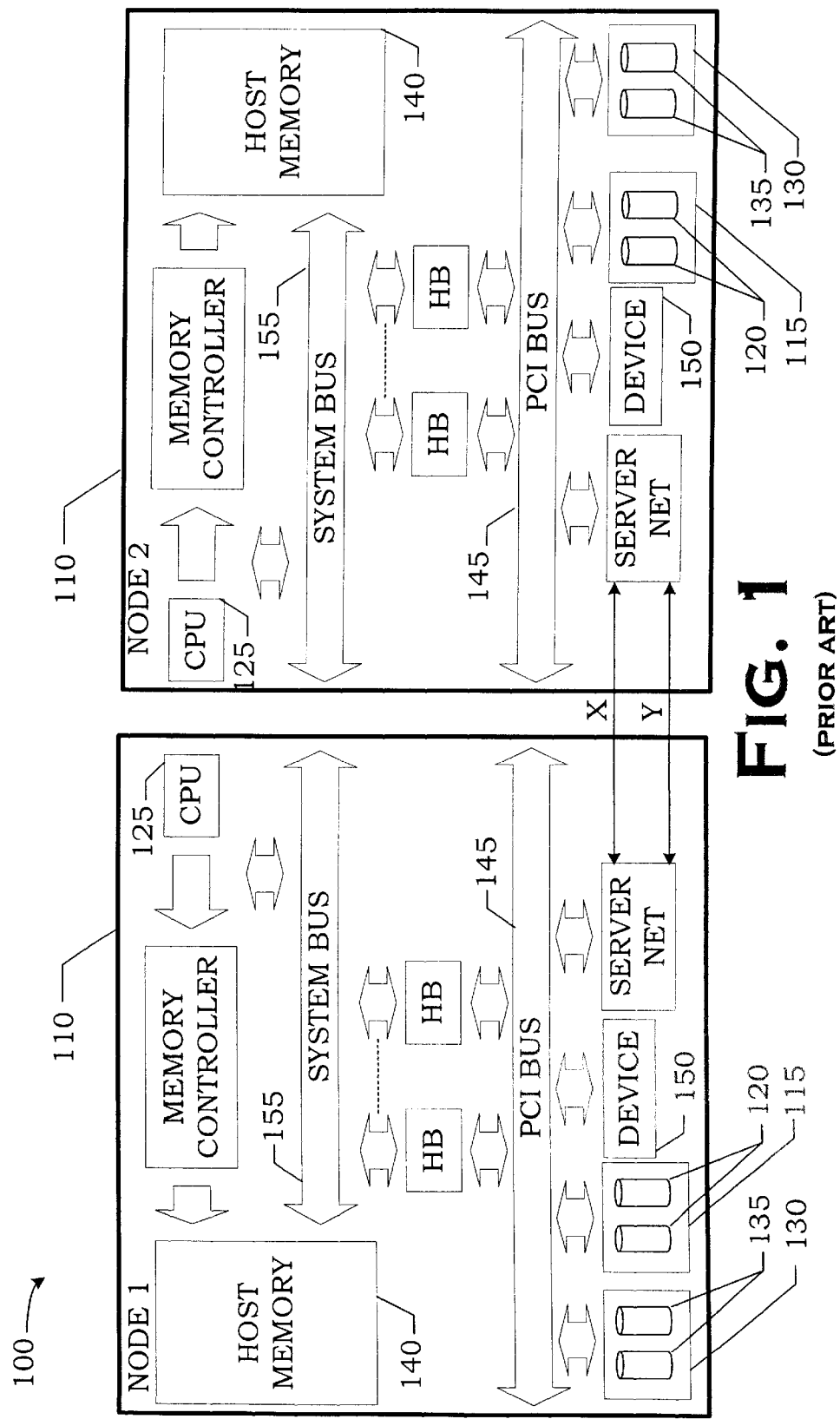
FIG. 1 illustrates conventional internodal data transfers in a prior art, clustered computing system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
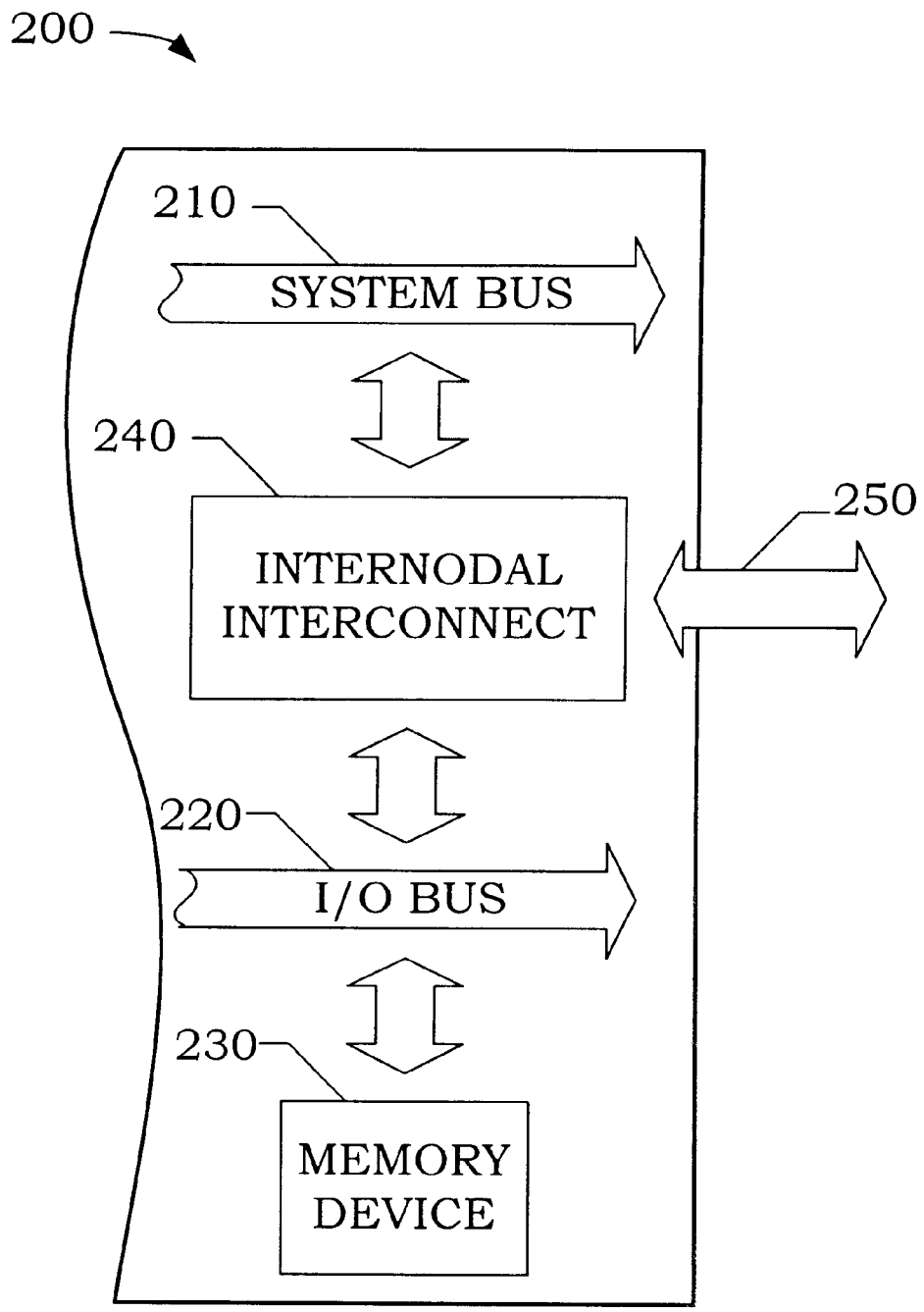
FIG. 2 depicts, in a conceptualized block diagram, an cluster node constructed and performing internodal data transfers in accordance with the present invention.

FIG. 2 depicts, in a conceptualized block diagram, a cluster node 200 constructed and configured to perform internodal data transfers in accordance with the present invention. The cluster node 200 comprises, in the illustrated embodiment, a system bus 210, an I/O bus 220, a memory device 230, and an internodal interconnect 240. The internodal interconnect 240 is capable of receiving data from local memory and commands over the system bus 210 and the I/O bus 220. The internodal interconnect 240 is also capable of receiving data from remote memory and commands over a remote connection 250.

The system bus 210 and the I/O bus 220 may operate in accordance with any suitable protocol known to the art. As will be appreciated by those in the art, the operation of the system bus 210 will be dictated to a large degree by the implementation of the CPU (not shown) residing on the system bus 210. The system bus 210 might, for example, be an X86 bus (such as a Pentium III™ or a Pentium Pro™ bus), although alternative embodiments might be implemented differently. Similarly, the I/O bus 220 might be implemented using a variety of protocols, e.g., a peripheral component interface ("PCI") bus or a PCI-X bus. Another technology that might be used in implementing the I/O bus 220 is known as "I2O". The I2O protocol is designed to work with the PCI bus. In the I2O protocol, specialized I/O processors (not shown) are used to handle certain aspects of the bus' implementation, e.g., interrupt handling, buffering, and data transfer. The I/O processors operate under an I2O driver, or operating system ("OS") module ("OSM") that handles higher level OS-type details through a specialized hardware device module ("HDM"). The OSM and HDM operate at the OS level, and function autonomously to handle transactions on the I/O bus, e.g., the I/O bus 220.

The memory device 230 is shown residing on the I/O bus 220. However, in alternative embodiments the memory device 230 might reside on the system bus 210. In still other alternative embodiments, a first memory device 230 might reside on the I/O bus 230 while a second memory device 230 resides on the system bus 210. The invention admits wide variation in the implementation of the memory device 230. The memory device 230 may be any type of memory device known to that art, and may be electrical, magnetic, or optical in nature. Thus, the memory device 230 might be implemented in, for example, a dynamic random access memory ("DRAM") device, an optical disk (e.g., a compact-disk read only memory, or "CD ROM"), or a magnetic disk (e.g., a hard drive disk). Other technologies may also be used. The memory device 230 may also comprise a portion of a host memory, a private memory, or a shared memory, depending upon the implementation. In the illustrated embodiment, the memory device 230 is a magnetic disk comprising a portion of a private or a shared memory.

Thus, in a more general sense, the internodal interconnect 240 is electrically connected between the system bus 210 and the I/O bus 220 and communicates with a memory device, e.g., the memory device 230, over one of the system bus 210 and the I/O bus 220. Note that the internodal interconnect 240 might therefore be employed in local data transfers as well as internodal transfers. Although the primary benefits of the present invention are more fully appreciated in the context of internodal data transfers, design constraints might make using the internodal interconnect 240 in local data transfers desirable in some implementations.

Figure 3A:
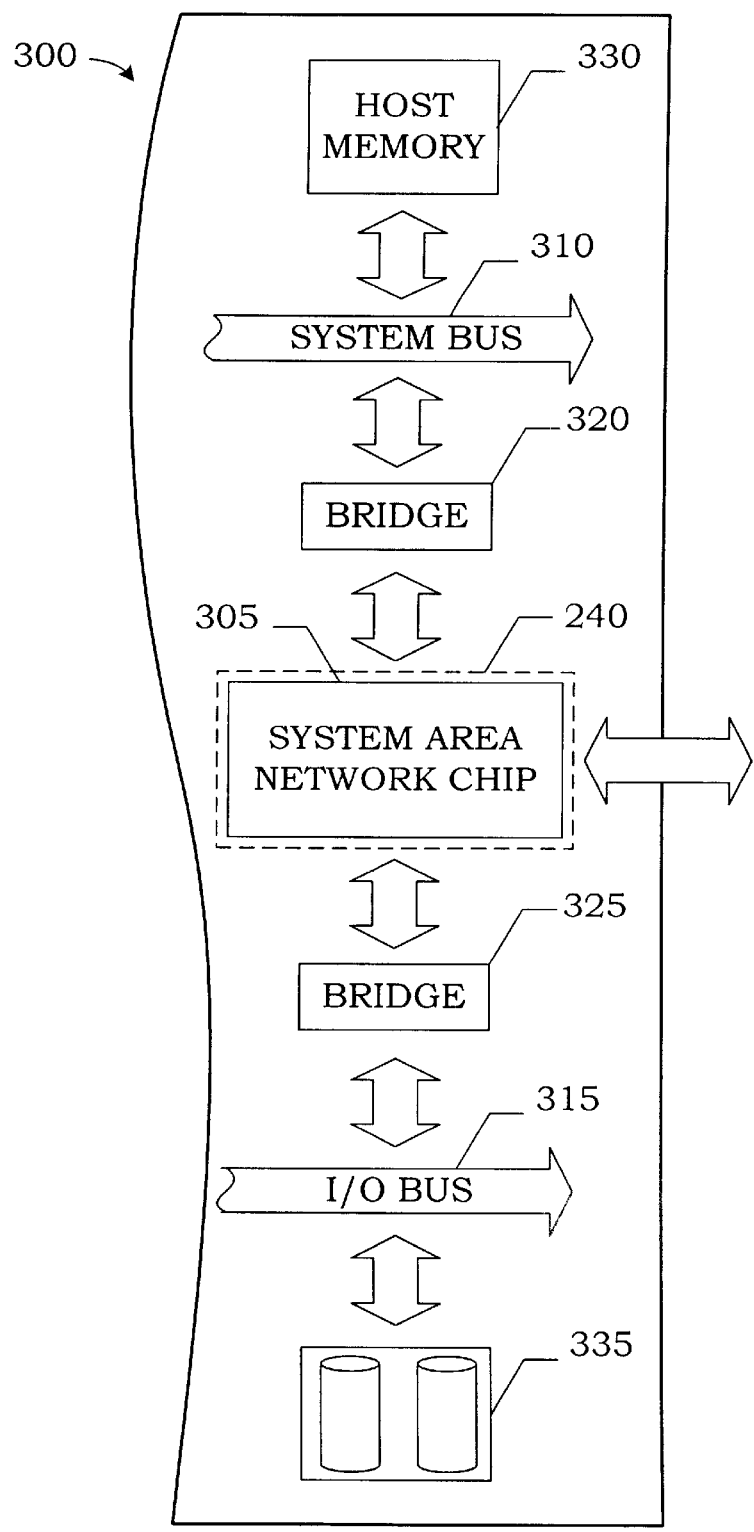
FIG. 3A depicts, in a conceptualized block diagram, one particular embodiment of the cluster node in FIG. 2.
Figure 3B:
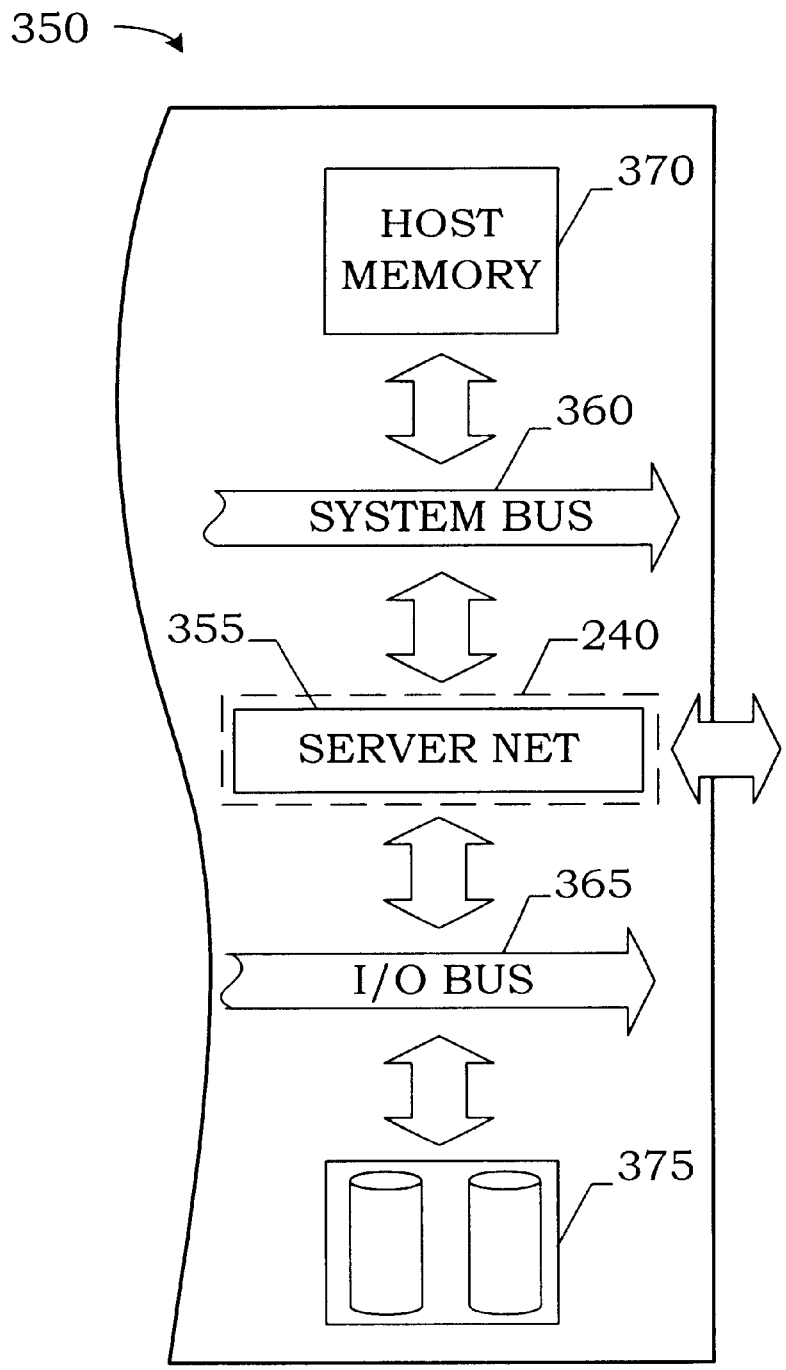
FIG. 3B depicts, in a conceptualized block diagram, a second particular embodiment of the cluster node in FIG. 2 alternative to that in FIG. 3A.

The invention also admits variation in the implementation of the internodal interconnect 240. FIG. 3A depicts, in a conceptualized block diagram, one particular embodiment 300 of the cluster node 200 in FIG. 2. In this particular embodiment, a "System Area Network Chip" 305 provides a single-chip implementation of the internodal interconnect 240. FIG. 3B depicts, in a conceptualized block diagram, a second particular embodiment 350 of the cluster node 200 in FIG. 2 as an alternative to that in FIG. 3A. In this particular embodiment, a network engine, e.g., ServerNet network engine, interconnection 355 provides another implementation of the internodal interconnect 240. Still other embodiments might be realized using alternative implementations.

Turning now to FIG. 3A, the System Area Network Chip 305 is a modified Host Bridge connected to both a System Bus 310 and an I/O bus 315. The chip 305 is a peer to the Host bridge 320 and the I/O Bridge 325. The chip 305 is produced by modifying a conventional host bridge to embed a conventional ServerNet engine therein. Note that this particular embodiment includes both a host memory 330 residing on the system bus 310 and a disk memory 335 residing on the I/O bus 315. The disk memory 335 may be either a private memory or a shared memory. Thus, the embodiment 300 may be used to implement the invention in memory to memory transfers, memory to disk transfers, and disk to disk transfers, both internodal and local.

FIG. 3B depicts an embodiment 350 in which the internodal interconnect 240 is implemented as a ServerNet chip 355. The ServerNet chip 355 is a part of the ServerNet Interconnect Technology commercially available from Compaq Computer Corp., the assignee of this application, who can be contacted at:

P.O. Box 692000
Houston, Tex. 77269-2000
Ph: 281-370-0670
Fax: 281-514-1740
<www.compaq.com>

Technical information regarding the ServerNet product is available at the numbers listed above and on the website.

Generally, ServerNet technology enables scalable I/O bandwidth such that, when a server is expanded, more data paths are added, and the aggregate bandwidth of the ServerNet interconnect increases. ServerNet technology does this by embedding a reliable network transport layer into a single very large scale integration ("VLSI") integrated circuit ("IC") hardware device to connect a processor or I/O device to a scalable interconnect fabric composed of as many very high-speed point-to-point data paths, as needed. Each high-speed path uses a hardware protocol to guarantee delivery of data between devices. The data paths allow system elements (processors, storage, I/O) to be joined into a system area network. Data paths from system elements are connected together within the system area network by means of six-port routers (not shown), which are single VLSI devices that use switching technology to direct requests to the correct data path. Using these routers, the system elements are assembled into as large a server as desired.

As in an ordinary computer network, any system element in a ServerNet configuration can communicate with any other element. While ServerNet can function as an interprocessor interconnect with both elements being processors, it also performs the role of connecting processors to I/O devices. ServerNet can also connect I/O devices directly to other I/O devices, so that data is transferred without requiring a trip through a processor. Data-intensive applications running on a processor can steer transfers through the server by managing directions rather than by moving the data itself. This capability streamlines data transfers and frees the processor for other important tasks.

The ServerNet architecture avoids the latency of multiple-bus interconnections by using an interconnect network to deliver data directly from any processor or I/O device to any other processor or I/O device. This low latency per connection, achieved by VLSI hardware, allows one of the shortest message-delivery latencies of any processor interconnect technology available today. ServerNet technology can eliminate software latency through its unique "push/pull" ability to extract or deliver data autonomously to a node. Interconnect data transfers can themselves contain the addresses of information in other node(s) to "push" (write) data to or "pull" (read) data from. A node can then request subsequent transfers from another node without requiring software interaction from that node, as the node's ServerNet device performs the operation without disturbing its processor.

Returning to FIG. 3B, this particular embodiment implements the internodal interconnect 240 using a conventional ServerNet interconnection 355 configured within the node 350 as shown. More particularly, the ServerNet interconnection 355 is electrically interconnected between the system bus 360 and the I/O bus 365. Note how this configuration differs from the conventional configuration show in FIG. 1. Note that this particular embodiment also includes both a host memory 370 residing on the system bus 360 and a disk memory 375 residing on the I/O bus 365. The disk memory 375 may be either a private memory or a shared memory. Thus, the embodiment 350 may also be used to implement the invention in memory to memory transfers, memory to disk transfers, and disk to disk transfers, both internodal and local.

Figure 4:
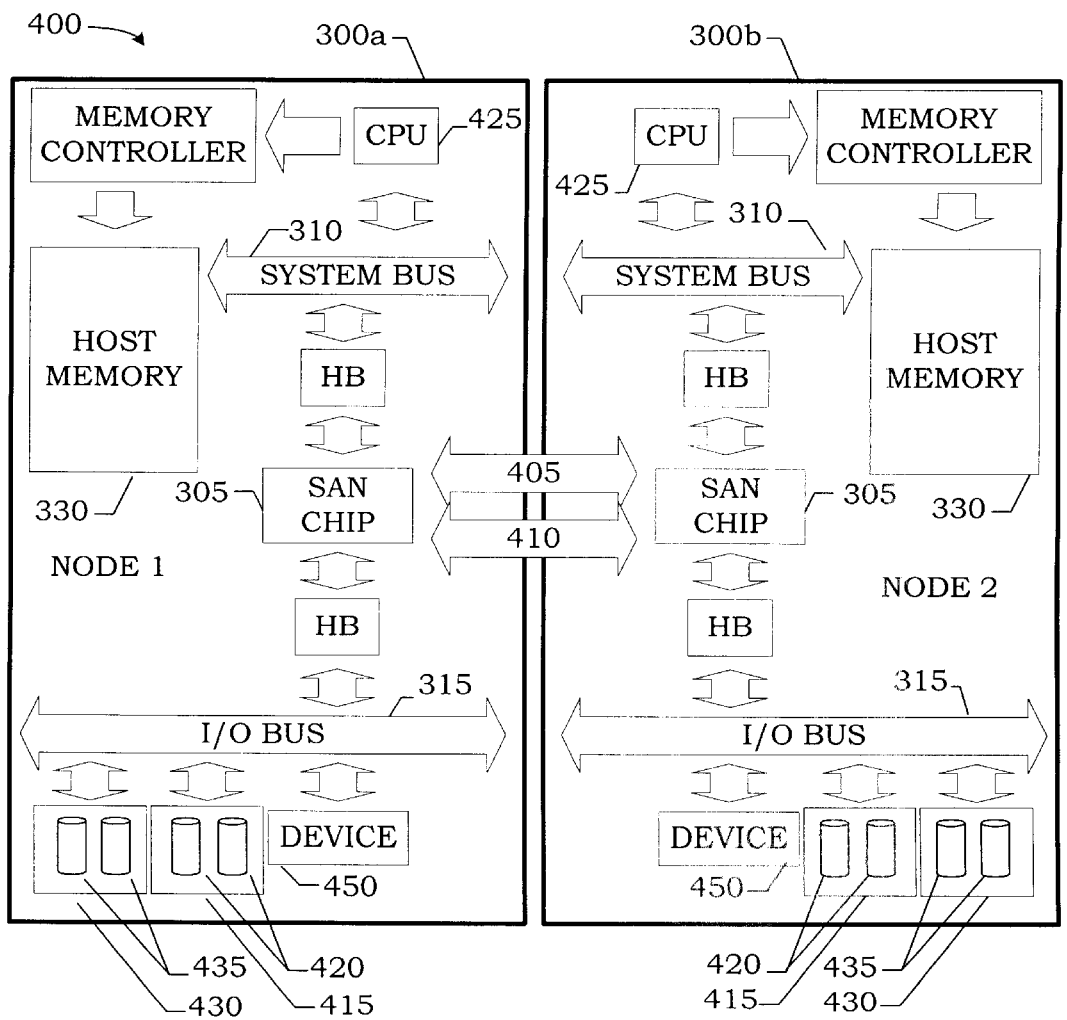
FIG. 4 illustrates internodal data transfers a clustered computing system architecture employing the embodiment of FIG. 3A of the cluster node in FIG. 2.
Figure 5:
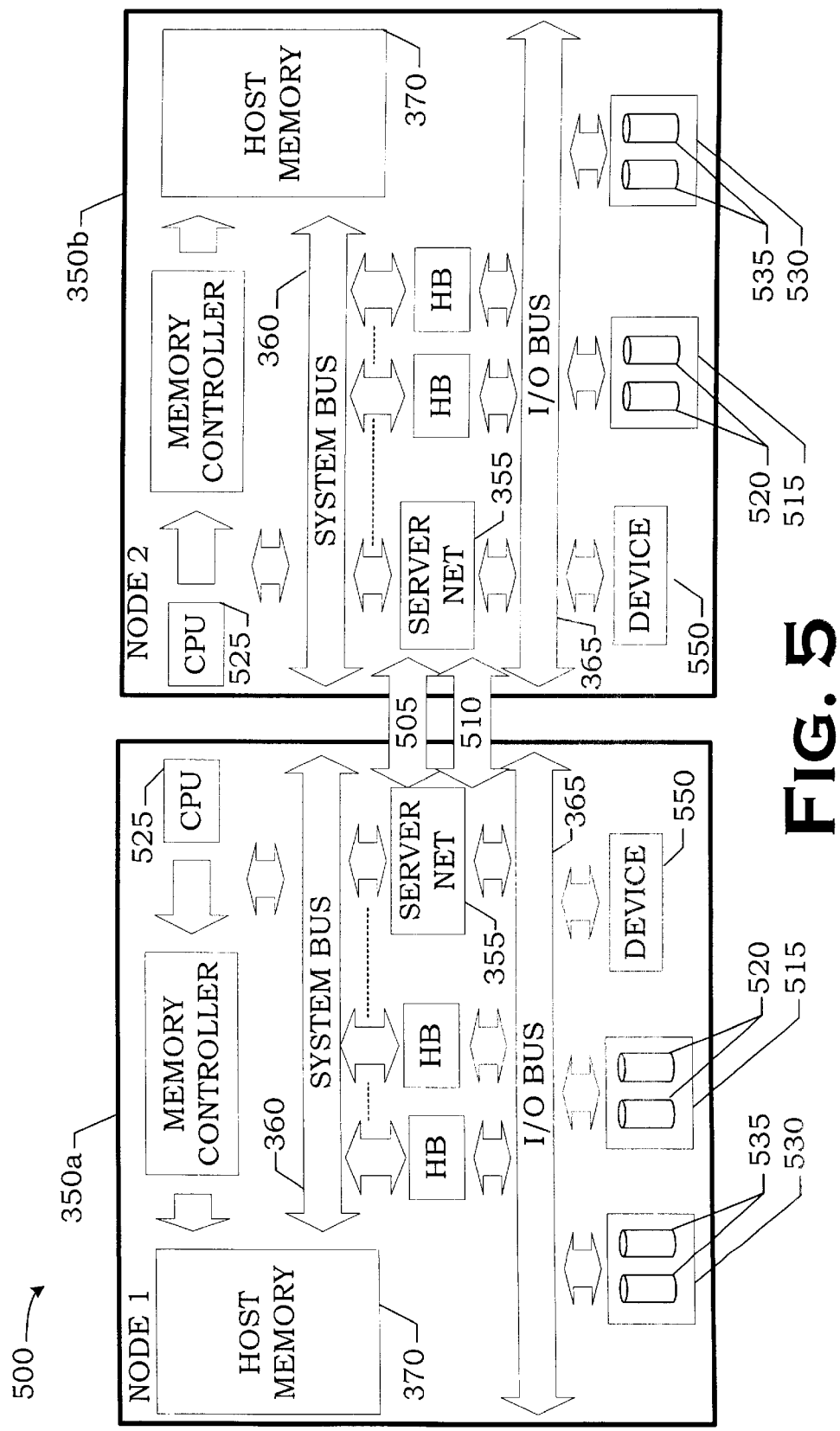
FIG. 5 illustrates internodal data transfers a clustered computing system architecture employing the embodiment of FIG. 3B of the cluster node in FIG. 2.

FIG. 4 and FIG. 5 illustrate internodal data transfers in a clustered computing system architecture employing the embodiments of FIG. 3A and of FIG. 3B, respectively, of the cluster node in FIG. 2. Both the computing system 400 in FIG. 4 and the computing system 500 in FIG. 5 include two remote connections between the SMP nodes, i.e., the remote connections 405, 410 in FIG. 4 and the remote connections 505, 510 in FIG. 5. The disk memory 335 in FIG. 3A is implemented in the shared memory 415 and the private memory 430 in FIG. 4. The disk memory 375 in FIG. 3B has been implemented in the shared memory 515 and the private memory 530.

Thus, the present invention comprises a faster, more efficient implementation of the three types of logical interconnections for internodal data transfer:

memory to memory, e.g., from the host memory 330, 370 in one node 300a, 350a to the host memory 330, 370 in the other node 300b, 350b;

memory to disk, e.g., from the host memory 330, 370 in one node 300a, 350a to a shared disk 435, 535 or a private disk 420, 520 in the other node 300b, 350b; and disk to disk, e.g., from a shared disk 435, 535 or a private disk 420, 520 in one node 300a, 350a to a shared disk 435, 535 or a private disk 420, 520 in the other node 300b, 350b.

As can be seen from the drawings, especially FIG. 4 and FIG. 5, memory to memory access between two nodes can occur concurrently with disk-to-disk transfers. This is because the former is first accomplished over the system bus 310, 360 while the latter occurs over the I/O bus 315, 365. As disk transfers are slower than memory transfers, IPC type data transfers from memory-to-memory will not experience the bottleneck or latencies associated with the I/O bus. Note that the internodal interconnect is theoretically capable of matching the data access rates of both the system bus and the I/O bus. Therefore, with the present invention, internodal data transfers will be limited primarily by the speed of the internodal interconnect.

Figure 6:
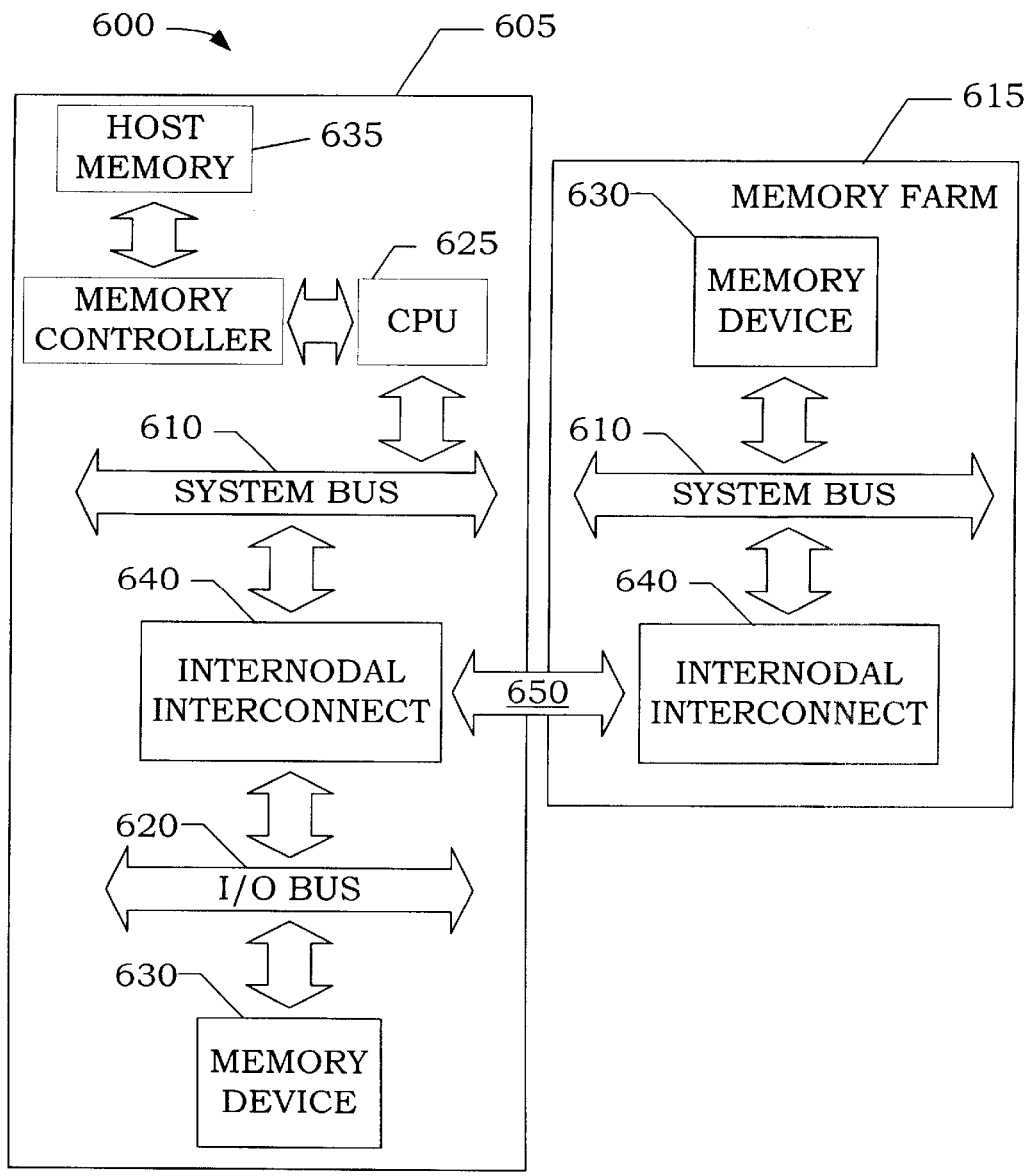
FIG. 6 illustrates internodal data transfers in embodiment alternative to those set forth above.

Note that, although the embodiments of FIG. 4 and FIG. 5 show data transfer between nodes that are similar in structure and function, this is not necessary to the practice of the invention. FIG. 6 illustrates internodal data transfers in such an embodiment alternative to those set forth above. In FIG. 6, the computing system 600 comprises a node 605 similar in structure and operation to the nodes in FIG. 4 and FIG. 5. However, the computing system 600 also includes a "memory farm" 615, which may be considered a node dedicated to storage, e.g., host memory. The node 605 is subject to all the variation in the nodes illustrated in the preceding embodiments, and the node 615 may be implemented in any manner known to the art. Both the nodes 605, 615, however, include an internodal interconnect 640 that may be, e.g., a SAN chip or a ServerNet connection. The memory farm 615, in the illustrated embodiment, includes a memory device 630 resident on the system bus 610 that may be part of a larger memory storage. Note that the memory farm 615 does not include an I/O bus. Memory transfers may occur between the memory devices 635, 630 in the node 605 and the memory device 630 of the memory 615 in a manner analogous to that described above for the computing systems 400, 500 in FIG. 4 and FIG. 5.

Furthermore, in the various illustrated embodiments and aspects of the invention, the invention yields one or more of the following advantages:

connection to the I/O bus as well as the system bus provides concurrent memory-to-memory and disk-to-disk or memory accesses;

memory to memory transfer could occur at system bus speeds;

SAN access of memory does not prevent access of other devices on the I/O bus;

capability for accessing data on either of the I/O buses; and connecting to the system bus enables split transaction capabilities.

However, the particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A cluster node comprising:
   a first bus coupled to a first memory device;
   a second bus coupled to a second-memory device; and
   an internodal interconnect electrically connected between the first bus and second bus, and the internodal interconnect is further coupled to a separate cluster node for transferring data between the first memory device and a third memory device within the separate cluster node while concurrently transferring data between the second memory device and a fourth memory device within the separate cluster node.

2. The cluster node of claim 1, wherein the first bus is a system bus, and wherein the system bus comprises an X86 bus.

3. The cluster node of claim 1, wherein the second bus is an I/O bus.

4. The cluster node of claim 1, wherein the internodal interconnect comprises a system area network chip or a network engine embedded in a host bridge chip.

5. The cluster node of claim 1, wherein the internodal interconnect comprises a network connection.

6. The cluster node of claim 2, wherein the X86 bus comprises a bus selected from the group consisting of a Pentium III bus and a Pentium Pro bus.

7. The cluster node of claim 1, wherein the first memory device comprises a host memory device residing on the system bus.

8. The cluster node of claim 3, wherein the I/O bus is a bus selected from the group consisting of a PCI bus and a PCI-X bus.

9. The cluster node of claim 3, wherein the second memory device comprises a memory device selected from the group consisting of a private memory device residing on the I/O bus and a shared memory device residing on the I/O bus.

10. A cluster node comprising:
   a system bus coupled to a first system memory;
   an I/O bus coupled to a first disk memory; and
   an internodal interconnect electrically connected between the system bus and the I/O bus, and wherein the internodal interconnect is further connected to a separate cluster node for communication between a second system memory of the separate cluster node and the first system memory concurrently with communication between a second disk memory of the separate cluster node and the first disk memory.

11. The cluster node of claim 10, wherein the system bus comprises an X86 bus.

12. The duster node of claim 10, wherein the I/O bus is a bus selected from the group consisting of a PCI bus and a PCI-X bus.

13. The cluster node of claim 10, wherein the first memory device comprises a memory device selected from the group consisting of a host memory device, a private memory device, and a shared memory device.

14. The cluster node of claim 10, wherein the internodal interconnect comprises a system area network chip or a network engine embedded in a host bridge chip.

15. The cluster node of claim 13, wherein the selected memory device is the host memory device and the host memory device resides on the system bus.

16. The duster node of claim 13, wherein the selected memory device is the shared memory device and the shared memory device resides on the I/O bus.

17. The cluster node of claim 13, wherein the selected memory device is the private memory device and the private memory device resides on the I/O bus.

18. A cluster node comprising:
   a system bus coupled to a first memory;
   an I/O bus coupled to a second memory; and
   means for internodal transfer of data, the internodal transfer means being electrically connected between the system bus and the I/O bus, and wherein the cluster node is coupled to a separate cluster node for communication between the first memory and a third memory of the separate cluster node concurrently with communication between the second memory and a fourth memory of the separate cluster node.

19. The cluster node of claim 18, wherein the system bus comprises an X86 bus.

20. The duster node of claim 18, wherein the I/O bus is a bus selected from the group consisting of a PCI bus and a PCI-X bus.

21. The cluster node of claim 18, wherein the first memory device comprises a memory device selected from the group consisting of a host memory device, a private memory device, and a shared memory device.

22. The cluster node of claim 18, wherein the internodal transfer means comprises a system area network chip or a network engine embedded in a host bridge chip.

23. The cluster node of claim 21, wherein the selected memory device is the host memory device and the host memory device resides on the system bus.

24. The cluster node of claim 21, wherein the selected memory device is the shared memory device and the shared memory device resides on the I/O bus.

25. The cluster node of claim 21, wherein the selected memory device is the private memory device and the private memory device resides on the I/O bus.

26. A computing system comprising:
   a first cluster node, the first cluster node including:
      a first system bus and a first I/O bus;
      a first memory device; and
      a first internodal interconnect electrically connected between the first system bus and the first I/O bus and capable of transferring data from the first memory device; and
   a second cluster node, the second duster node including:
      a second system bus and a second I/O bus;
      a second memory device; and
      a second internodal interconnect electrically connected between the second system bus and the second I/O bus and capable of transferring data from the second memory device, wherein the data transferred from the first memory is concurrent with the data transferred from the second memory.

27. The computing system of claim 26, wherein one of the first and second system buses comprises an X86 bus.

28. The computing system of claim 26, wherein one of the first or second I/O buses is a bus selected from the group consisting of a PCI bus and a PCI-X bus.

29. The computing system of claim 26, wherein at least one of the first and second memory devices comprises a host memory device.

30. The computing system of claim 26, wherein at least one of the first and second memory devices comprises a shared memory device residing on the I/O bus or a private memory device and the private memory device residing on the I/O bus.

31. The computing system of claim 26, wherein one of the first and second internodal interconnects comprises a system area network chip or a network engine embedded in a host bridge chip.

32. The computing system of claim 26, wherein one of the first and second cluster nodes comprises a memory farm.

33. The computing system of claim 27, wherein the X86 bus comprises a bus selected from the group consisting of a Pentium III bus and a Pentium Pro bus.

34. A computer system comprising:
   a first cluster node, the first cluster node including:
      a first system bus and a first I/O bus;
      a first memory device; and
      first means for internodal transfer of data, the first internodal transfer means electrically connected between the first system bus and the first I/O bus and capable of communicating transferring data from the first memory device out of the first cluster node; and
   a second cluster node, the second cluster node including:
      a second system bus and a second I/O bus;
      a second memory device; and
      a second means for internodal transfer of data, the second internodal transfer means being electrically connected between the second system bus and the second I/O bus and capable of transferring data from the second memory device out of the second cluster node, wherein the data transferred from the first memory is transferred concurrently with the data transferred from the second memory.

35. The computing system of claim 34, wherein one of the first and second system buses comprises an X86 bus.

36. The computing system of claim 34, wherein one of the first or second I/O buses is selected from the group consisting of a PCI bus and a PCI-X bus.

37. The computing system of claim 34, wherein at least one of the first and second memory devices comprises a host memory device residing on the system bus.

38. The computing system of claim 34, wherein at least one of the first and second memory devices comprises a shared memory device residing on the I/O bus or a private memory device residing on the I/O bus.

39. The computing system of claim 34, wherein one of the first and second internodal transfer means comprises a system area network chip or a network engine embedded in a host bridge chip.

40. The computing system of claim 34, wherein one of the first and second cluster nodes comprises a memory farm.

41. A method for internodal data transfer in a clustered computing system, wherein each one of at least two cluster nodes includes an internodal interconnect electrically connected between a system bus and an I/O bus, the method comprising:

requesting a first and second data transfer;

transferring the first requested data from a first memory device in a first cluster node to a third memory device in a second cluster node via the internodal interconnects in the first and second cluster nodes; and transferring the second requested data from a second memory device in the first cluster node to a fourth memory device in the second cluster node via the interconnects in the first and second cluster nodes, wherein the transferring of the first and second requested data are concurrent.

42. The method of claim 41, wherein one of the first or second memory device is selected from a group consisting of a host memory device, a private memory device, and a shared memory device.

43. The method of claim 41, wherein transferring the requested data to the third or fourth memory devices in the second cluster node includes transferring the requested data to a memory device selected from the group consisting of a host memory device, a private memory device, and a shared memory device.

44. The cluster node of claim 41, wherein one of the internodal interconnect in the first cluster node and the internodal interconnect in the second cluster node comprises a system area network chip or a network engine embedded in a host bridge chip.

45. The method of claim 42, wherein the selected memory device is the host memory device residing on the system bus.

46. The method of claim 42, wherein one of the first or second memory device comprises a shared memory device residing on the I/O bus or a private memory device residing on the I/O bus.

47. The method of claim 43, wherein the selected memory device is the host memory device and the host memory device resides on a system bus.

48. The method of claim 43, wherein the selected memory device is a shared memory device residing on an I/O bus or a private memory device residing on the I/O bus.

49. The method of claim 45, wherein the system bus comprises an X86 bus.

50. The method of claim 46, wherein the I/O bus is a bus selected from the group consisting of a PCI bus and a PCI-X bus.

51. The method of claim 47, wherein the system bus comprises an X86 bus.

52. The method of claim 48, wherein the I/O bus is a bus selected from the group consisting of a PCI bus and a PCI-X bus.

53. A node system, comprising:

first memory coupled to a system bus;

a second memory coupled to an I/O bus; and an internodal interconnect coupled between the system bus and the I/O bus, wherein the internodal interconnect permits communication between the first memory and a third memory associated with a separate node system at a first data transfer rate while permitting communication between the second memory and a fourth memory associated with the separate node system at a second data transfer rate that differs from the first data transfer rate.

54. The node system of claim 53 wherein the first data transfer rate corresponds to a data access rate of the system bus.

55. The node system of claim 53 wherein the second data transfer rate corresponds to a data access rate of the I/O bus.

* * * * *